(12) United States Patent
Karlen et al.

(10) Patent No.: US 9,773,586 B2
(45) Date of Patent: Sep. 26, 2017

(54) POWERED REMOVAL FOR ELEMENT FORMED BY ELECTRON BEAM MELTING

(71) Applicant: HAMILTON SUNDSTRAND CORPORATION, Windsor Locks, CT (US)

(72) Inventors: Eric Karlen, Rockford, IL (US); William Louis Wentland, Rockford, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 372 days.

(21) Appl. No.: 14/660,545

(22) Filed: Mar. 17, 2015

(65) Prior Publication Data

US 2016/0271697 A1 Sep. 22, 2016

(51) Int. Cl.
| | |
|---|---|
| B23K 26/34 | (2014.01) |
| B22F 5/12 | (2006.01) |
| B22F 3/24 | (2006.01) |
| H01B 13/00 | (2006.01) |
| B22F 3/105 | (2006.01) |
| B22F 5/10 | (2006.01) |

(52) U.S. Cl.
CPC ....... *H01B 13/0036* (2013.01); *B22F 3/1055* (2013.01); *B22F 3/24* (2013.01); *B22F 5/10* (2013.01); *B22F 2003/247* (2013.01); *B23K 26/34* (2013.01); *Y02P 10/295* (2015.11)

(58) Field of Classification Search
CPC .......... B23K 26/34; B22F 5/12; B22F 3/1055; B22F 3/24; B22F 2003/247; H01B 13/0036

USPC .............. 219/121.16, 121.17, 121.35; 419/4; 148/97

See application file for complete search history.

(56) References Cited

U.S. PATENT DOCUMENTS

| | | | | |
|---|---|---|---|---|
| 4,104,445 A | * | 8/1978 | Dobo | ...................... B22F 1/004 419/4 |
| 4,386,970 A | * | 6/1983 | Fukutsuka | .......... H01L 39/2409 29/599 |
| 2010/0291401 A1 | | 11/2010 | Medina | |

FOREIGN PATENT DOCUMENTS

| | | | |
|---|---|---|---|
| EP | 3053676 A1 | 8/2016 | |
| GB | 2110135 A | * 6/1983 | ........... B22D 11/005 |
| GB | 2517490 A | 2/2015 | |
| JP | 2003225948 A | 8/2003 | |
| WO | 2013137283 A1 | 9/2013 | |

OTHER PUBLICATIONS

European Search Report for Application No. 16160748.6-1373. Mailed on Sep. 8, 2016. 10 Pages.

* cited by examiner

*Primary Examiner* — Samuel M Heinrich
(74) *Attorney, Agent, or Firm* — Cantor Colburn LLP

(57) ABSTRACT

A method for forming a part. The method includes: forming a first portion of the part at a first level; forming a second portion of the part at a second level; wherein forming the first and second portions includes exposing the first and second levels to a sintering process and portions of the first and second levels to an electron beam; forming a wire in the passage formed inside the first and second portions by exposing a portion of the passage to the electron beam; applying a signal to the wire to break up sintered material in the passage; and removing the wire.

18 Claims, 4 Drawing Sheets

POWERED REMOVAL FOR ELEMENT FORMED BY ELECTRON BEAM MELTING

BACKGROUND OF THE INVENTION

This invention relates forming elements or parts and, more particularly, to a method of removing power from parts formed by electron beam melting.

Powder bed fusion (PBF) methods use either a laser or electron beam to melt and fuse material powder together. Electron beam melting (EBM) is a particular example of a PDF method and is a type of additive manufacturing (AM) for metal parts. In particular, it is a powder bed fusion technique process where an electron beam is used to melting metal powder layer by layer in a vacuum to form a product. One unique aspect of EBM additive manufacturing is that non-melted particles, i.e. those particles not utilized in the final part, are sintered together. The sintering process binds the non-melted particles together providing additional mechanical strength during the build process. The sintered particle is very difficult to remove from more complex structures, particularly those that contain internal features such passages or blind holes. Another type of PDF utilizes a laser. Powder is not sintered but complex geometries may still exist that include powder.

BRIEF DESCRIPTION OF THE INVENTION

According to one aspect of the invention, a method for forming a part is disclosed. The method includes: forming a first portion of the part at a first level; forming a second portion of the part at a second level; wherein forming the first and second portions includes exposing the first and second levels to a sintering process and portions of the first and second levels to an electron beam; forming a wire in the passage formed inside the first and second portions by exposing a portion of the passage to the electron beam; applying a signal to the wire to break up sintered material in the passage; and removing the wire.

According to some aspects of the invention, a method for forming a part includes: forming a first portion of the part at a first level; forming a second portion of the part at a second level; wherein the first and second portions are formed by exposing, respectively, by exposing some of the first level and some of the second level to a laser beam; forming a wire in the passage formed inside the first and second portions by exposing a portion of the passage to the laser beam; applying a signal to the wire to break up sintered material in the passage; and removing the wire.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

As briefly described above, it is very difficult to remove the dense, sintered powder after completion of the build. Parts with internal features such as passages within a housing have to be specially processed in order to remove dense powder. Powder removal is a step that, for complex parts, will add cost to an additively built part. Embodiments disclosed herein may provide a more efficient or economical solution to removing the dense power.

The methods disclosed herein may expedite and minimize the amount of time required for powder removal from PBF (including EBM and laser PBF) manufactured parts. In one embodiment, the removal element is formed as a portion of the part itself, used to remove the powder and then discarded. The methods disclosed herein may be especially useful in removing hardened powered in internal surfaces of a part.

Figure 1:
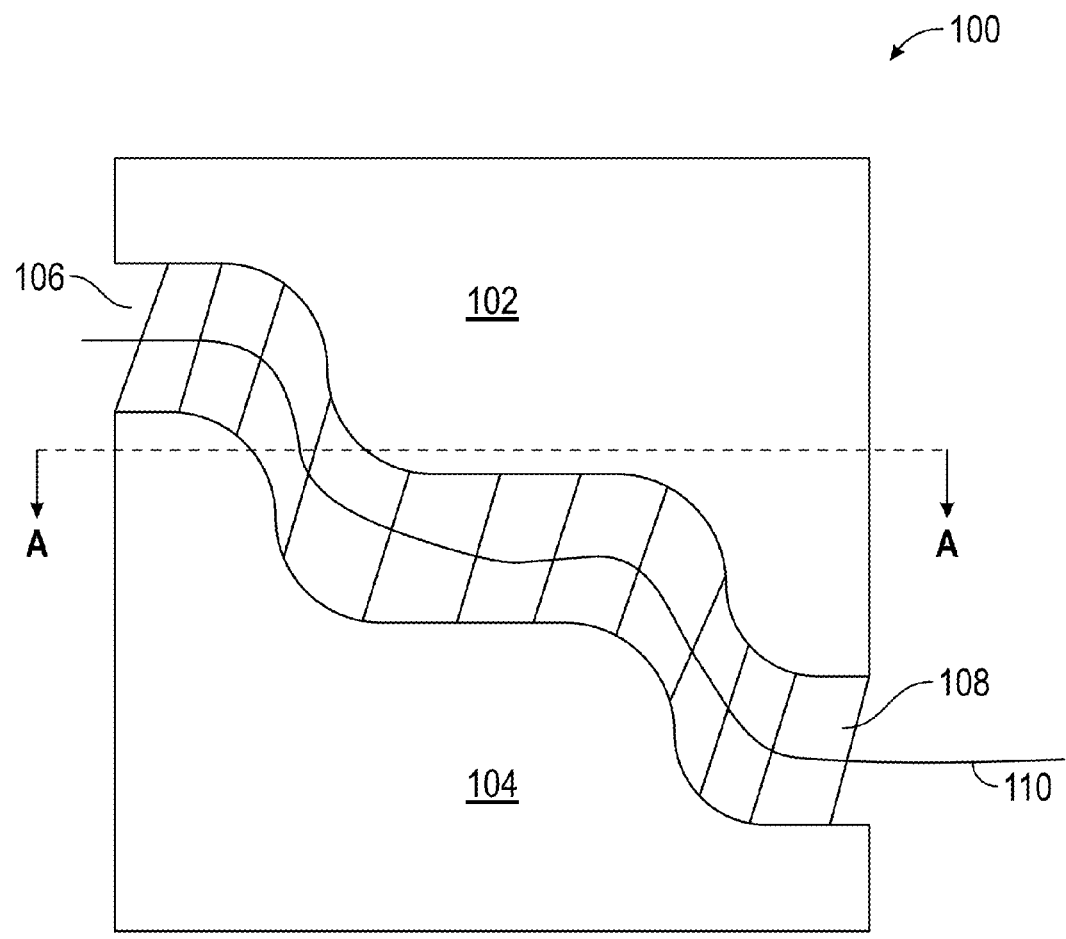
FIG. 1 is a cut-away side view of a part including powder and a removal wire.

FIG. 1 is an example of part 100 that is formed by PBF shown in a cut-away side view. While the following describes an EBM process, the removal methods are applicable to all PBF created pieces where powder needs to be removed from internal passages. The part 100 includes first and second portions 102, 104 separated by an internal passage 106. As the part 100 is formed, metallic power is first layered down and then sintered. The portions of the part 100 that are to become part of the final product are then exposed to an electron beam to convert the sintered powder to a hard metal object. However, the portions of the part that are not exposed to the electron beam are still sintered, just not fully hardened by the electron beam.

In the example in FIG. 1, the passage 106 may be filled with sintered material 108. That is, the portions 102, 104 are metal pieces formed by exposing the sintered powder to an electron beam to form the fully hardened metal. Portions that are not exposed remain as partially hardened sintered material as illustrated by sintered material 108. Removal of this material to open, for example, passage 106 may be difficult, especially when the passage is not a straight or varies in size. According to one embodiment, as the part 100 is being formed, a wire 110 is formed through the passage 106. The wire 110 is formed in the same manner as the portions 102, 104. That is, as each level of the part 100 is formed, a small portion of the otherwise sintered only section (e.g., material 108) is exposed to the electron beam to form a continuous wire 110 through it.

Figure 2:
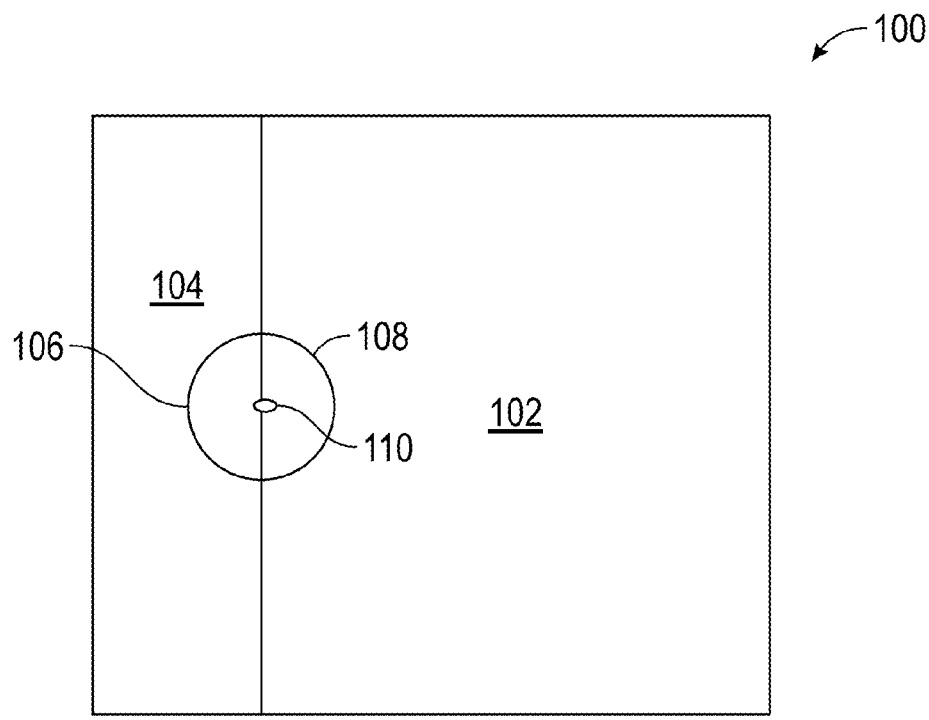
FIG. 2 is a top view of the part of FIG. 1 taken along line A-A.

FIG. 2 shows a top view of the part taken along line A-A from FIG. 1. The portions 102, 104 have been exposed to the electron beam to fully harden them. So too has the wire 110. Thus, portions 102, 104 and wire 110 are in the same state of processing and are fully hardened metal. The passage 106 is shown as including sintered material 108 that has not been exposed to an electron beam. This is the material that needs to be removed in order to allow material to pass through passage 106. For example, if the part 100 is a manifold, passage 106 would need material 108 removed in order to allow fluids to pass through it.

With reference to both FIGS. 1 and 2, in one embodiment, the wire 110 may be coupled to a transducer 112. The transducer 112 is an ultrasonic transducer in one embodiment. In one embodiment, the transducer 112 provides an ultrasonic input to the wire 100 which causes the sintered material 110 to more easily be removed.

Figure 3:
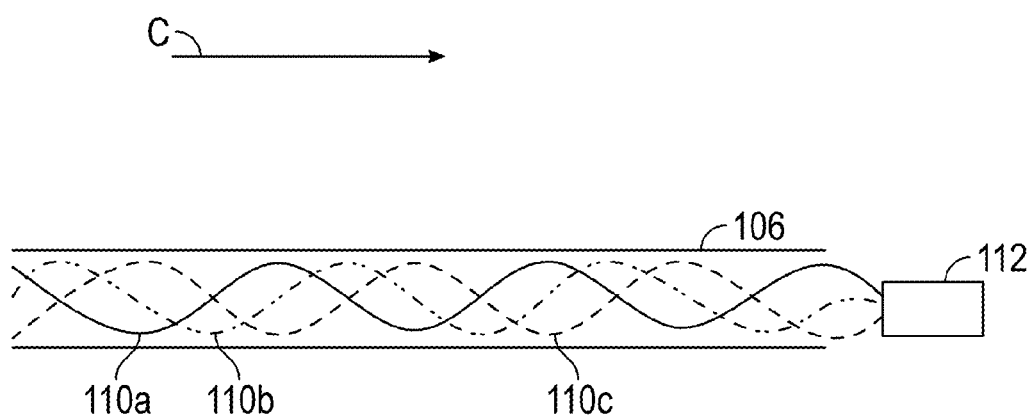
FIG. 3 depicts one example of a passage with multiple wires formed therein.

FIG. 3 shows an alternative embodiment. Again, a passage 106 is formed that includes sintered material (not shown). Portions of sintered material are exposed to form multiple sinusoidal wires 110*a*, 110*b*, 110*c*. The number of wires can be varied from 1 to any number and the wires can be either straight or sinusoidal. Using sinusoidal wire shapes may allow for more ultrasonic energy from the transducer 112 to be contact the sintered material in the passage 106. Further, as the wires 110 are pulled out (for example, in direction C) the increased surface area of additional wires may remove more powder.

Figure 4:
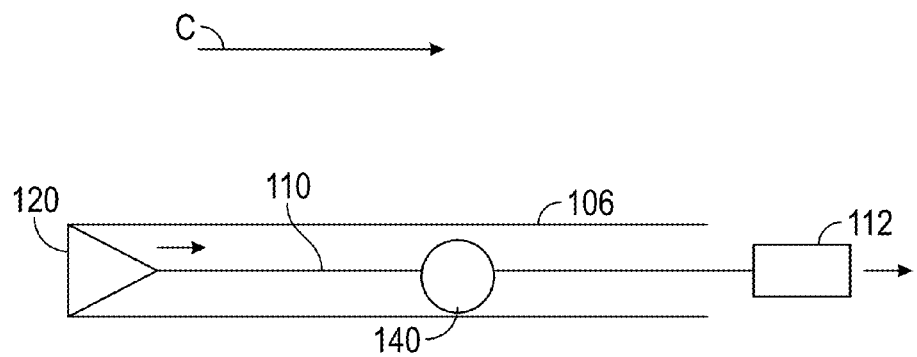
FIG. 4 depicts another embodiment of a wire including a cleaning attachment.
Figure 5:
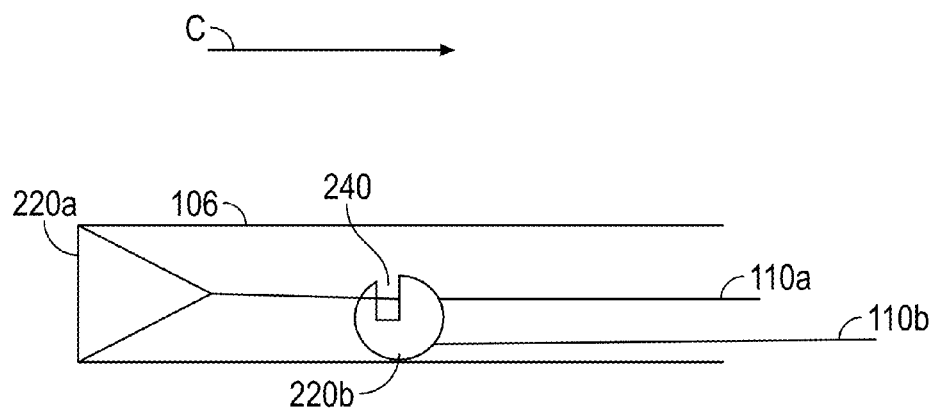
FIG. 5 shows an alternative embodiment that includes multiple wires and cleaning elements in combination.

FIG. 4 shows yet another embodiment. In this embodiment, the passage 106 is formed to include wire 110 a cleaning element 120. The cleaning element 120 is formed of the same material as the wire in one embodiment. As the wire 100 is removed (direction C) the cleaning element 120 may aid in powder removal. The particular shape of the cleaning element 120 may be varied from that shown in FIG. 4. Also, more cleaning elements 120 may be provided. In general, the cleaning element 120 has a larger cross-section than the wire 110. In another embodiment, one or more optional additional cleaning elements 140 may be added to the wire 110. One or more of the additional elements 140 may be of a different size or shape than cleaning element 120.

In yet another embodiment, nested cleaning elements 220 may be provided. Each element (e.g., 220*a*, 220*b*) may be attached to an individual wire 110*a*, 110*b*, respectively. As illustrated, a first cleaning element 220*a* is attached to a first wire 110*a* and a second cleaning element 220*b* is attached to a second cleaning element 220*b*. In this configuration, the first wire 110*a* passes through a hole or other passage way (e.g., notch 240) formed in the second cleaning element 220*b*. This allows the second cleaning element 220*b* to be removed before the first cleaning element 220*a*. In this manner, a first amount of powder may be removed and then a second amount (assuming that the second cleaning element 220*b* is smaller than the first cleaning element 220*a*). In on embodiment, the wires 110*a*. 110*b* may run through different channels to allow them both to work in the illustrated channel 106 and then to work in different channels as they are removed.

Figure 6:
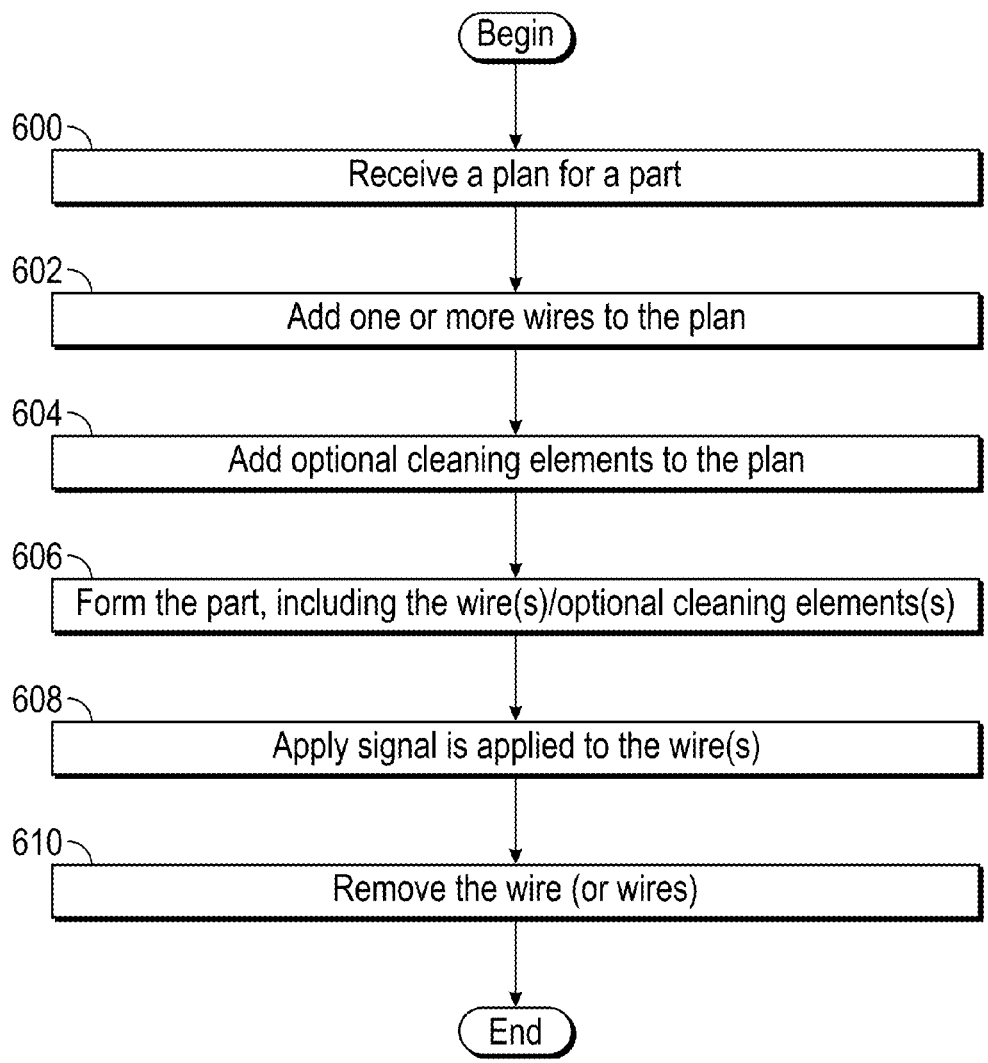
FIG. 6 is a flow chart of one method of removing powder.

FIG. 6 shows a method according to one embodiment. The method includes several optional steps that may or may not be needed depending on the particular wire/cleaning element combination chosen.

At block 600 a plan for part is received. The plan may, for example, be a representation of the part or it may be CAD model of the part. One or more wires are added to the plan at block 602. The added wires are added such that they will be formed in an interior passage(s) of the part. At block 604 optional cleaning elements are added to the plan. At block 606 the part, including the wire(s)/optional cleaning element (s), is formed. The part and the wires are formed using electron beam manufacturing as described above. At block 608 a signal is applied to the wires. This signal causes sintered powder to break up or otherwise become easier to remove. The signal is an ultrasonic signal in one embodiment. At block 610 the wire (or wires) is removed.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for forming a part, the method comprising:
    forming a first portion of the part at a first level;
    forming a second portion of the part at a second level;
    wherein forming the first and second portions includes exposing the first and second levels to a sintering process and portions of the first and second levels to an electron beam;
    forming a wire in the passage formed inside the first and second portions by exposing a portion of the passage to the electron beam;
    applying a signal to the wire to break up sintered material in the passage; and
    removing the wire.

2. The method of claim 1, wherein the first and second levels are formed from a sintered metallic powder.

3. The method of claim 2, wherein forming the at least one wire includes forming a first wire and a second wire.

4. The method of claim 2, wherein the first wire has a sinusoidal shape.

5. The method of claim 2, wherein forming the at least one wire includes forming a cleaning element on the wire.

6. The method of claim 5, wherein the cleaning element has a larger cross-section than the wire.

7. The method of claim 6, further, comprising:
    forming a secondary wire;
    forming a secondary cleaning element on the second wire;
    applying a signal to the secondary wire; and
    removing the secondary wire and the secondary cleaning element.

8. The method of claim 7, wherein the wire passes at least partially through the secondary cleaning element.

9. The method of claim 1, wherein the signal is an ultrasonic signal.

10. A method for forming a part, the method comprising:
    forming a first portion of the part at a first level;
    forming a second portion of the part at a second level;
    wherein the first and second portions are formed by exposing, respectively, by exposing some of the first level and some of the second level to a laser beam;
    forming a wire in the passage formed inside the first and second portions by exposing a portion of the passage to the laser beam;
    applying a signal to the wire to break up sintered material in the passage; and
    removing the wire.

11. The method of claim 10, wherein the first and second levels are formed from a powder.

12. The method of claim 11, wherein forming the at least one wire includes forming a first wire and a second wire.

13. The method of claim 11, wherein the first wire has a sinusoidal shape.

14. The method of claim 11, wherein forming the at least one wire includes forming a cleaning element on the wire.

15. The method of claim 14, wherein the cleaning element has a larger cross-section than the wire.

16. The method of claim 15, further, comprising:
    forming a secondary wire;
    forming a secondary cleaning element on the second wire;
    applying a signal to the secondary wire; and removing the secondary wire and the secondary cleaning element.

17. The method of claim 16, wherein the wire passes at least partially through the secondary cleaning element.

18. The method of claim 10, wherein the signal is an ultrasonic signal.

* * * * *